Patented Apr. 4, 1944

2,345,660

UNITED STATES PATENT OFFICE 2,345,660

METHOD FOR POLYMERIZING VINYL COMPOUNDS

Alfred W. Downes, South Charleston, and John R. Kernan, Charleston, W. Va., assignors to Carbide and Carbon Chemicals Corporation, a corporation of New York No Drawing. Application February 15, 1941, Serial No. 379,042

6 Claims. (Cl. 260—86)

Vinyl resins of the type formed by the conjoint polymerization of vinyl halides, particularly vinyl chloride, with the vinyl esters of lower aliphatic acids, notably vinyl acetate, are well known, and resins formed from the specific ingredients mentioned are utilized commercially on a large scale. The commercial application for which these resins are adapted depends primarily on two factors in their composition; the percentage of combined vinyl chloride which they contain and their average macromolecular weight. Thus, soluble but chemically resistant resins for forming lacquers are those conjoint polymers having molecular weights from 7,000 to 10,000 and combined vinyl chloride contents of from 70 to 88%, tough and strong resins for use in molding compositions are the conjoint polymers having molecular weights from 10,000 to 15,000 and vinyl chloride contents from 85 to 90%, and more insoluble resins for making fibers and for making highly plasticized elastic compositions suitable for leather substitutes and for cable insulation are those conjoint polymers which have molecular weights of from 15,000 to 30,000 and combined vinyl chloride contents of from 85 to 95%. The molecular weights referred to are determined according to Staudinger's method from viscosity measurements of dilute resin solutions.

To correlate production with the demand for specific types of resin, it is highly desirable to carry out the conjoint polymerization of vinyl chloride with vinyl acetate so that a resin of predetermined vinyl chloride content and molecular weight may be obtained. As a basic approach to this problem much study has been given to the factors affecting polymerization, and certain fundamental principles have been derived. The regulation of the vinyl chloride content of the resin is relatively simple since the percentage of vinyl chloride in the polymer depends on the ration of vinyl chloride to vinyl acetate monomers charged to the reaction vessel; a somewhat higher content of vinyl chloride being found in the polymer than existed in the mixture of monomers charged.

However, control of the average molecular weight of the resin formed during the polymerization is more difficult. The complexity of this problem is shown by the fact that known methods of polymerization give rise to resins composed of a mixture of polymers of widely different molecular weights but having approximately the same vinyl chloride content. This means that a myriad of individual reactions giving rise to single macromolecules have to be controlled so that a resin of the desired average molecular weight is obtained. To facilitate control, it was found that the polymerization required the assistance of a catalyst and that it was best conducted in a solvent medium. It was also determined that the rate of polymerization, using the typical peroxide catalysts, was a direct function of the catalyst concentration and that the molecular weight of the resin formed was an inverse function of this variable, other things being equal. These relationships are illustrated in the following table which presents the results of polymerizations carried out in glass tubes containing 50% acetone and 50% vinyl compounds by weight in the ratio of three parts of vinyl chloride to one part of vinyl acetate.

TABLE A

*Variation of molecular weight and rate of polymerization with catalyst concentration at 50° C.*

| Catalyst, dibenzoyl peroxide (percent by weight of total charge) | Molecular weight of resin at 50% conversion of monomers | Rate of polymerization (percent monomers converted per hour) |
|---|---|---|
| 2.0 | 10,400 | 5.9 |
| 1.0 | 10,700 | 4.0 |
| 0.4 | 11,300 | 2.4 |
| 0.2 | 11,600 | 1.5 |
| 0.1 | 11,700 | 0.8 |

As a result of this relationship, higher molecular weight resins can be obtained at present only at extremely low rates of reaction. It is known that the rate of polymerization can be raised materially by an increase in temperature but the improvement obtained is more than offset by a diminution of the molecular weight, even at low concentrations of catalyst, of the resin produced. This is illustrated in the following table which shows the results of polymerizations conducted at higher temperatures but otherwise under conditions identical to those discussed in Table A.

TABLE B

*Variation of molecular weight and rate of polymerization with catalyst concentration at 70° C.*

| Catalyst, dibenzoyl peroxide (percent by weight of total charge) | Molecular weight of resin at 50% conversion of monomers | Rate of polymerization (percent monomers converted per hour) |
|---|---|---|
| 2.0 | 6,300 | 34 |
| 1.0 | 7,200 | 26 |
| 0.4 | 8,000 | 15 |
| 0.2 | 8,200 | 10 |
| 0.1 | 8,400 | 7 |

According to this invention, vinyl halides are conjointly polymerized with vinyl esters of lower aliphatic acids at rates greatly exceeding those heretofore possible for the production of resins of an equivalent molecular weight. This invention is predicated on the discovery that minute amounts of hydrogen peroxide, by which is meant amounts of hydrogen peroxide ($H_2O_2$) less than 0.1% by weight of the total reaction mixture, or less than 0.17% by weight of the vinyl compounds polymerized, bring about a very rapid rate of polymerization.

This is in distinct contrast to the effect exerted by the amounts of hydrogen peroxide which have heretofore been used as polymerization catalysts. These amounts, in general, have varied from 0.3% to about 1.6% by weight of the vinyl compounds polymerized and, at these concentrations, hydrogen peroxide is not significantly different from other catalysts in its effect. Moreover, the accelerating influence on the rate of polymerization which minute amounts of hydrogen peroxide exert is all the more unusual in that equally minute amounts of the organic peroxide produce an extremely slow rate of polymerization.

The critical nature of the hydrogen peroxide concentration is shown in the following table which gives the results of polymerizations conducted in glass equipment at a temperature of 40° C. In each experiment, the charge consisted of, by weight, 40% acetone, 45% vinyl chloride, 15% vinyl acetate and varying amounts of hydrogen peroxide.

TABLE C

*Effect of hydrogen peroxide on rate of polymerization at 40° C.*

| Concentration of hydrogen peroxide (per cent by weight) | | Time in hours | Conversion per cent | Rate of polymerization (per cent monomers converted per hour) | Molecular weight |
| --- | --- | --- | --- | --- | --- |
| On total charge | On vinyl compounds | | | | |
| 0.30 | 0.50 | 42.0 | 18.0 | 0.43 | 5,700 |
| 0.20 | 0.33 | 42.0 | 10.0 | 0.24 | 6,000 |
| 0.10 | 0.17 | 63.0 | 24.5 | 0.39 | 7,000 |
| 0.05 | 0.083 | 4.5 | 54.0 | 12.0 | 10,500 |
| 0.025 | 0.042 | 7.75 | 63.0 | 8.14 | 11,200 |
| 0.0125 | 0.019 | 17.0 | 47.0 | 2.76 | 13,300 |

The rate of polymerization represents the percentage of monomers charged to the polymerization vessel which are converted per hour to resin. In a batch process, the rate is an average rate determined by dividing the total conversion of monomers to resin by the total time of polymerization in hours. In a continuous process, the rate of polymerization represents the percentage of monomers in the polymerization vessel which are converted per hour to resin.

These results show that at concentrations below 0.10% of the reaction mixture or below 0.17% of the vinyl compounds, the amount of hydrogen peroxide catalyst is critical and diminishing this amount causes an unexpected and marked increase in the rate of polymerization. This permits the formation of the resins of high molecular weight at a rate much faster than was heretofore possible. In fact, the increase in rate is so pronounced that the polymerizations may be completed in a matter of hours, rather than of days as previously required. The data presented in the above table are not strictly comparable with those given in Table A, because of the difference in temperature and in concentration of vinyl compounds, but these minor variations in reaction conditions are not significant. Other tests, under otherwise identical conditions of polymerization, have established that the rate of polymerization using minute amounts of hydrogen peroxide is from six to ten times as fast as can be obtained even when from four to two times as much of an organic peroxide is employed as a catalyst. Thus, a conversion of 47% of the mixed monomers of vinyl chloride and vinyl acetate to a conjoint polymer was obtained in five hours using 0.025% hydrogen peroxide, based on the total reaction mixture, as a catalyst whereas, for the same degree of conversion using 0.1% diacetyl peroxide as the catalyst, a total reaction time of 37 hours was required.

It is obvious that the increased rate of polymerization obtained according to this invention is of extreme practical importance as it permits the productive capacity of a polymerization autoclave of a given size to be greatly increased. In addition, the hydrogen peroxide catalyst is readily removed from the resin after polymerization whereas the organic peroxides are somewhat tenaciously retained. The presence of residual peroxides in the resin is disadvantageous since the resistance of the resin to heat and light is impaired.

The principle upon which this invention is based is an exception to the general rule of catalyst activity, and so far as our research indicates, it is not of wide applicability. The invention appears to be limited to the production of conjoint polymer resins in which the vinyl halide content predominates. This may be explained by the fact that the invention is not applicable to the polymerization of vinyl organic esters alone. That is, contrary to the statements in Patent No. 1,586,803 to Herrmann and Baum, we have found that the use of minute amounts of hydrogen peroxide as a catalyst in the polymerization of vinyl acetate gives results which are inferior to those obtained when the customary amounts of organic peroxides, such as diacetyl or dibenzoyl peroxide, are employed. For instance, when 100 parts of vinyl acetate were heated for two hours at 110° C. in the presence of 1.5 parts of 3% hydrogen peroxide (0.045% $H_2O_2$) and in the presence of 0.05 parts of 27.6% hydrogen peroxide (0.014% $H_2O_2$) the respective yields of polyvinyl acetate were 20.6 and 28.0%. On the other hand, when 100 parts of vinyl acetate were heated for two hours at 110° C. with 0.1% diacetyl peroxide and 0.2% dibenzoyl peroxide, the yields of polyvinyl acetate were higher, being 48.5% and 44.5% respectively.

As a result of our experiments with hydrogen peroxide as a catalyst for polymerization reactions, we have found that this material is very susceptible to decomposition. When larger concentrations of hydrogen peroxide then embraced by this invention are employed as a catalyst, considerable amounts of free oxygen are released through decomposition. This tends to inhibit the polymerization which may account for the poor results observed when the usual catalytic amounts of hydrogen peroxide are employed. At the same time, when working with amounts of hydrogen peroxide less than 0.1% by weight of the total reaction mixture, we have observed that, unless precautions are taken, the hydrogen peroxide tends to be rapidly depleted. As a consequence, low rates of polymerization may result. We have discovered that the rapid decomposition of the hydrogen peroxide is caused by the catalytic influence of the metals commonly used in polymerization autoclaves, notably lead, iron and stainless steel. While in some cases it may be feasible to compensate for this loss of hydrogen peroxide by the periodic or continual addition of fresh material, it is preferred to use inert materials of construction for at least the inner surface of the polymerization autoclave. Typical of such inert materials are glass, enameled surfaces, platinum, glazed earthenware, baked phenolic resin coatings, and passivated aluminum. The aluminum may be passivated by standard methods, such as by treatment with chromates and chromic acid, or with nitric acid.

The polymerization may be practiced according to either a continuous or batch procedure but it is preferably carried out according to the latter method by charging the vinyl halide and vinyl ester monomers, mixed with an organic solvent and with the appropriate amount of hydrogen peroxide, desirably in aqueous solution, to an autoclave. The temperature is regulated between about 30° C. and about 80° C., preferably between 30° C. and 60° C., the exact value depending on the molecular weight of resin to be produced. The polymerization occurs rapidly and is continued until a large fraction of the monomers have been converted to a conjoint polymer. The resin may be recovered from the resultant viscous dispersion by precipitation or by spray drying. Solvents which may be employed as the dispersion medium are ketones, such as acetone or methyl ethyl ketone and esters, such as methyl or ethyl acetate. In some cases, where resins of extremely high molecular weight are to be produced, it may be desirable to use very little solvent or none at all. Thus, for the production of resins having molecular weights in excess of 15,000 and vinyl chloride contents in excess of 85%, small amounts only, ranging up to 5%, of solvents such as acetone, should be used.

The following examples illustrate the practice of this invention:

*Example 1.*—Forty-five parts of monomeric vinyl chloride and 15 parts of monomeric vinyl acetate were dissolved in 40 parts of acetone and sufficient hydrogen peroxide was added in a 30% aqueous solution so that the hydrogen peroxide content of the mixture was 0.025 part. This mixture was charged to a glass-lined pressure resistant vessel and heated at a temperature of 40° C. Polymerization took place rapidly and, at the end of five hours, 47% of the monomeric vinyl compounds had been converted to a conjoint polymer of vinyl chloride with vinyl acetate containing about 85% combined vinyl chloride. The resultant resin was colorless and easily purified to remove all traces of peroxide catalyst. The resin could be molded into tough and strong articles and it was soluble in certain organic solvents, such as ketones.

*Example 2.*—Forty-five of monomeric vinyl chloride and 15 parts of monomeric vinyl acetate and 0.05 parts of hydrogen peroxide in the form of a 30% aqueous solution were dissolved in 40 parts of acetone and the mixture placed in a glass-lined pressure resistant vessel. Upon heating the mixture to 40° C., polymerization occurred rapidly without an appreciable induction period before the reaction was initiated. At the end of 4.8 hours, 71% of the vinyl compounds had been converted to a conjoint polymer of vinyl chloride with vinyl acetate. As a consequence of the greater amount of catalyst employed in this example than in the preceding one, a more rapid rate of polymerization was effected with the production of a resin of somewhat lower molecular weight.

*Example 3.*—A pressure-resistant vessel of aluminum was passivated by treating it with a 4% aqueous solution of potassium dichromate containing 2% sulfuric acid for 20 hours. A mixture of 45 parts of vinyl chloride, 15 parts of vinyl acetate, 40 parts of acetone and 0.025 part of hydrogen peroxide were charged to this vessel and the temperature raised to 40° C. At the end of five hours, 43% of the monomeric vinyl compounds had been converted to a conjoint polymer of vinyl chloride and vinyl acetate having properties similar to those of the resin described in Example 1.

*Example 4.*—Forty-five parts of monomeric vinyl chloride, 15 parts of monomeric vinyl acetate, 40 parts of acetone and 0.025 part of hydrogen peroxide were placed in a pressure resistant vessel of aluminum which had been previously passivated. The temperature was raised to 40° C. and held there for 7.8 hours. At the end of this time it was found that 56% of the vinyl compounds had been converted to a conjoint polymer of vinyl chloride with vinyl acetate. This resin had properties similar to those of the resin described in Example 1.

Modifications of the invention other than as described in the foregoing examples will be apparent to those skilled in the art and are included within the scope of the invention as defined by the appended claims.

We claim:

1. Process of producing a conjoint polymer of vinyl chloride and vinyl acetate containing a predominant amount of vinyl chloride at a rate of polymerization in excess of about 2.76% monomers polymerized per hour which comprises conjointly polymerizing vinyl chloride and vinyl acetate at a temperature between about 30° C. and about 80° C. in a mixture in which is maintained a concentration of hydrogen peroxide of the order of about 0.0125 to 0.05% by weight of the mixture.

2. Process of producing a conjoint polymer of vinyl chloride and vinyl acetate containing a predominant amount of vinyl chloride at a rate of polymerization in excess of about 2.76% monomers polymerized per hour which comprises conjointly polymerizing vinyl chloride and vinyl acetate at a temperature between about 30° C. and about 80° C. in a mixture in which is maintained a concentration of hydrogen peroxide of the order of about 0.019 to 0.83% by weight of the total vinyl compounds.

3. Process of producing a conjoint polymer of vinyl chloride and vinyl acetate containing a predominant amount of vinyl chloride at a rate of polymerization in excess of about 2.76% monomers polymerized per hour which comprises conjointly polymerizing vinyl chloride and vinyl acetate at a temperature between about 30° C. and about 80° C. in a mixture in which is maintained a concentration of hydrogen peroxide of the order of about 0.0125 to 0.05% by weight of the mixture, said mixture being contained in a vessel the inner surface of which is inert to hydrogen peroxide.

4. Process of producing vinyl resins containing a predominant amount of vinyl chloride at relatively high rates of reaction which comprises conjointly polymerizing vinyl chloride with vinyl acetate in a mixture in which is maintained an effective catalytic amount of hydrogen peroxide less than about 0.083% by weight of the total vinyl compounds present.

5. Process of producing a conjoint polymer of vinyl chloride with vinyl acetate containing a predominant amount of vinyl chloride and having a molecular weight in excess of 10,500 at a rate of polymerization in excess of 2.76% monomers polymerized per hour which comprises forming an acetone dispersion containing 50 to 95 parts of vinyl chloride and 5 to 50 parts of vinyl acetate, maintaining therein an amount of hydrogen peroxide from about 0.0125 to 0.05% by weight of the dispersion, heating the dispersion at a temperature between 30° and 60° C., and recovering said conjoint polymer from the dispersion after polymerization.

6. Process of producing a conjoint polymer of vinyl chloride with vinyl acetate having a combined vinyl chloride content in excess of 85% by weight and a molecular weight in excess of 15,000 which comprises forming a mixture containing about one part of vinyl acetate, at least three parts of vinyl chloride and an amount of acetone up to 5% by weight of the mixture, maintaining therein an amount of hydrogen peroxide less than about 0.05% by weight of the mixture and heating the mixture at a temperature between 30° and 60° C.

ALFRED W. DOWNES.
JOHN R. KERNAN.

CERTIFICATE OF CORRECTION.

Patent No. 2,345,660.  April 4, 1944.

ALFRED W. DOWNES, ET AL.

It is hereby certified that error appears in the printed specification of the above numbered patent requiring correction as follows: Page 1, first column, line 1, for "Vinvyl" read --Vinyl--; line 40-41, for "ration" read --ratio--; page 2, first column, line 35, Table C, in the heading to columns 1 and 2 thereof, after "weight" insert a closing parenthesis; page 3, first column, line 62, after "forty-five" insert --parts--; and second column, line 56, claim 2, for "0.83%" read --0.083%--; line 68, claim 3, after "the mixture" strike out the period and insert instead a comma; and that the said Letters Patent should be read with this correction therein that the same may conform to the record of the case in the Patent Office.

Signed and sealed this 30th day of May, A. D. 1944.

Leslie Frazer

(Seal)  Acting Commissioner of Patents.